United States Patent [19]

Kohata et al.

[11] 4,367,521

[45] Jan. 4, 1983

[54] PWM INVERTER DEVICE

[75] Inventors: Masakazu Kohata, Kamakura; Takashi Sano, Yokohama; Ichiro Miyashita, Yamato, all of Japan

[73] Assignee: Toyo Denki Seizo Kabushiki Kaisha, Tokyo, Japan

[21] Appl. No.: 167,234

[22] Filed: Jul. 10, 1980

[30] Foreign Application Priority Data

Jul. 13, 1979 [JP] Japan .................................. 54-88163

[51] Int. Cl.³ .............................................. H02P 7/36
[52] U.S. Cl. .................................... 363/136; 318/801
[58] Field of Search .................. 318/722, 800–802; 363/135–138

[56] References Cited

U.S. PATENT DOCUMENTS

| 3,911,340 | 10/1975 | Plunkett | 318/802 |
| 4,099,109 | 7/1978 | Abbondanti | 318/722 X |
| 4,158,801 | 6/1979 | Hirata | 318/801 |

*Primary Examiner*—A. D. Pellinen
*Attorney, Agent, or Firm*—Phillips, Moore, Lempio & Finley

[57] ABSTRACT

An inverter device operating under pulse width modulation (PWM) principle in which chopping pulse is formed by crossing points of a triangle waveform and a function waveform in order that pulse width of the inverter input current decreases towards later half of pulse train in each period of pulse repetition series so as to make the average input current for each one of the pulses substantially constant.

5 Claims, 8 Drawing Figures

4,367,521

PWM INVERTER DEVICE

BACKGROUND OF THE INVENTION

The present invention relates to an inverter operating in a pulse width modulation (PWM) principle or to a modulation system in the PWM inverter apparatus.

In a conventional PWM inverter, the control is effected by using a so called square wave shaped voltage obtained by chopping a certain dc voltage so that the waveform of the chopped current may differ at each of the PWM period and accordingly the value of the commutating current varies greatly depending on the pulse series even under a same load condition. More especially, the duration of one cycle of the inverter is prolonged in counter proportion to the output frequency of the inverter in low speed frequency range. In view of this fact, the number of triangle wave signal forming the carrier signal in this duration or the pulse mode is generally increased at lower speed and thus the peak current at current commutation is suppressed. In this case, the waveform of the input current for the inverter assumes equivalently the same envelope with the motor current formed essentially by RL circuit and increases exponentially so that the current of the pulse voltage at each termination period of the repetition pulses increases also exponentially even the aforementioned increase of the pulse mode. Due to this fact the thyrister element and the current commutating circuit elements forming the inverter device should be selected to withhold the maximum current. The frequency components contained in the inverter input current include higher harmonic components of 6 times higher than the inverter output frequency beside the abovementioned chopping frequency, since the input current flows from the feeder through a filter in a form of three-phase full-wave rectification of the motor current in general by the inverter. By this reason, at the low frequency time such as the starting time, the feeder current may not be sufficiently smoothed by a decrease of the filter efficiency so that the feeder current may contain ripple components. Moreover in the rail constituting return path, in which the inverter input current flows, there is also flow of security signal current which is in general in the commercial frequency. Accordingly, when an electric train is driven by a PWM inverter, the frequency range of the security signal system passes the device in the low frequency range especially at the starting time since the filtering effect is decreased at such low frequency range and certain signal trouble might be caused.

SUMMARY OF THE INVENTION

The present invention is to improve the aforementioned disadvantages of the prior art devices and is to realize a modulation system being able to ease the current commutating duty of the inverter and to decrease the current of lower harmonic component so as to obtain a small and light weight device.

DESCRIPTION OF THE DRAWINGS

The invention will now be described by referring to the accompanying drawings, in which.

DESCRIPTION OF PREFERRED EMBODIMENT

The invention will now be described by referring to the accompanying drawings. In order to help clear understanding of the invention at first a conventional device will be explained by referring to FIGS. 1 and 2. This conventional device is the case of a 3-phase inverter, wherein m=3, m representing the number of phases.

Figure 1:
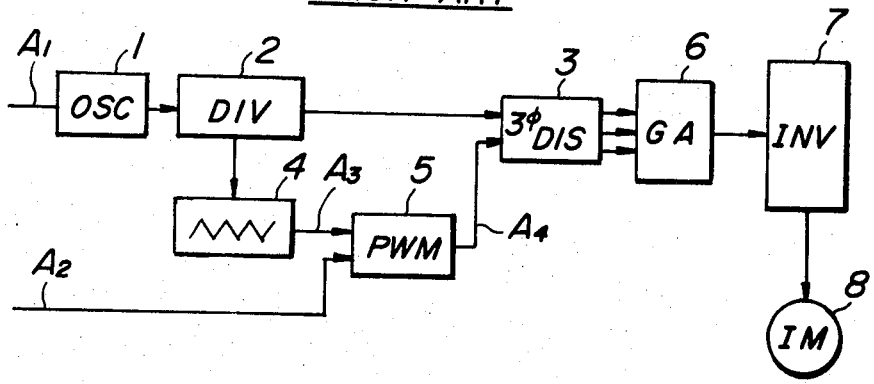
FIG. 1 is a block diagram of a typical conventional circuit arrangement of an inverter modulating device.

FIG. 1 shows a block diagram of a basic construction of modulation part of an inverter of a conventional type. In this figure, 1 designates an oscillator, 2 a frequency divider, 3 a three-phase signal distributor, 4 a triangle wave generator, 5 a modulator, 6 a gate controller, 7 an inverter, and 8 is an ac motor.

Figure 2:
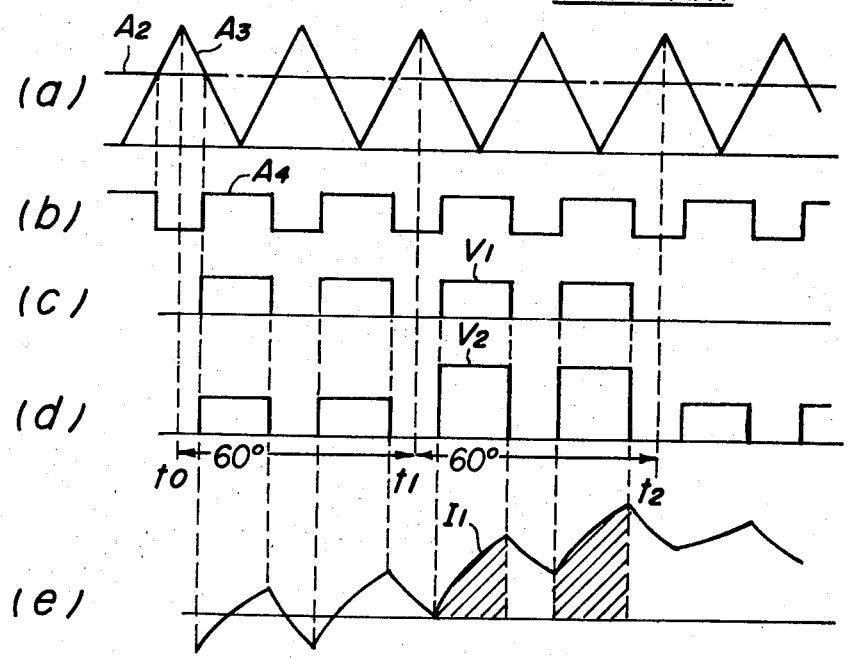
FIG. 2 is waveform diagram for various parts for explaining the operation of the device shown in FIG. 1.

Operation of the device shown in FIG. 1 will be explained by referring to waveforms shown in FIG. 2.

A frequency instruction $A_1$ for designating the operation frequency of the inverter is applied to the oscillator 1 and this oscillator 1 generates a pulse series having frequency being an integer multiple of the operating frequency of the inverter. The frequency divider 2 divides said frequency of the pulses up to minimum necessary multiplex frequency for deriving respective phase voltage signal of the inverter 7 and applies it to the triangle wave generator 4. On the other hand the three-phase signal distributor 3 is also given the output pulse series from the frequency divider 2 and it converts into respective phase signal. At the same time the three-phase signal distributor 3 is supplied with the output signal of the modulator 5 as the chopping instruction $A_4$ and modulates said respective phase signal by this instruction $A_4$. Based on the output of the three-phase signal distributor 3, gate signal for switching element in each phase of the inverter 7 formed for instance of a thyristor is delivered from the gate controller 6. This gate controller 6 may also generate a signal for controlling current commutating operation of the switching element forming the inverter 7 when the element requires such current commutation. The aforementioned chopping instruction $A_4$ can be obtained in the following manner.

A triangle wave carrier signal $A_3$ at the output of the triangle wave generator 4 is compared with a level signal $A_2$ of constant voltage being a voltage instruction and for instance, if the carrier signal $A_3$ is higher than the level signal $A_2$, the output of the modulator 5 is made as a logic value "L" and on the contrary when the level signal $A_2$ is higher than the carrier signal $A_3$, the output of the modulator 5 is made as a logic value "H." By the chopping instruction $A_4$ obtained in the foregoing manner, each phase voltage signal of the three-phase signal distributor 3 is modulated. The one phase voltage waveform $V_1$ being applied between motor terminals U and V is for example as shown in FIG. 2(c). A voltage being applied between motor terminals V and W delayed by 60° electric angle from said voltage waveform $V_1$ is represented by phase waveform $V_2$ which is shown in FIG. 2(d). A current waveform $I_1$ flowing through the ac motor 8 by application of the phase voltage waveform $V_2$ is shown in FIG. 2(e). Since the carrier signal $A_3$ should be integral multiple of the inverter operating frequency, the frequency divider 2 is in general formed in the following way. As an example of a most simplest circuitry being easily conceived by those skilled in the art in electronics is that to make frequency division in $\frac{1}{2}$ at 1st stage, and to make further division to $\frac{1}{4}$ at 2nd stage, or in general to $2^{-n}$ (n ... number of steps and n=1,2,3. . .) in each successive stage. If we assume the number of steps is 4 (n=4), the output frequency of the final output stage becomes 1/16 of the input pulse frequency. Also we may obtain either $\frac{1}{2}$, $\frac{1}{4}$, or $\frac{1}{8}$ as an intermediate output. From this and using these synchronizing pulses the triangle wave generator 4 is controlled and the desired triangle wave signal in an integer multiple of the inverter operating frequency can be obtained.

According to the aforementioned conventional modulation system of the inverter, the inverter current during 1/6 cycle of the inverter from time $t_1$ to time $t_2$ may have a waveform as shown in FIG. 2(e) which increases according to the lapse of time. The dc input current flowing in the inverter 7 is equal to the fullwave rectification of the respective phase current and it assumes a waveform of repetition of the hatched portion shown in FIG. 2(e). As can be seen from this example, the difference of current values at beginning end and at terminating end of a period starting from an instant $t_1$ and terminating at an instant $t_2$ assumes ripple component of the inverter input current including 6 times higher harmonics of the inverter output frequency. This will cause an increase of the commutating current at the terminating period of the chopping. Furthermore, the aforementioned ripple component may result trouble in security signal system although substantial part of the same is removed by the filter.

The present invention is to provide a novel modulation system of the aforementioned chopping instruction signal. The invention is to decrease the current ripple in the inverter input current and to effectively prevent security signal trouble as well as to realize a compact device.

Figure 3:
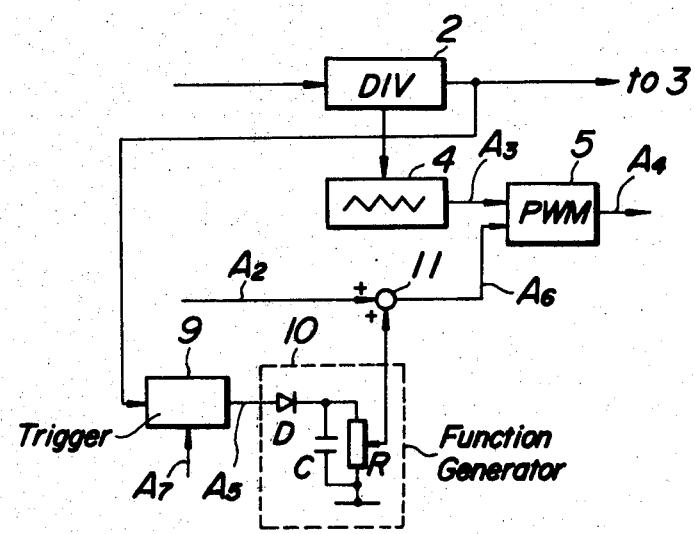
FIG. 3 is a block diagram of an inverter modulating device according to the present invention.
Figure 4:
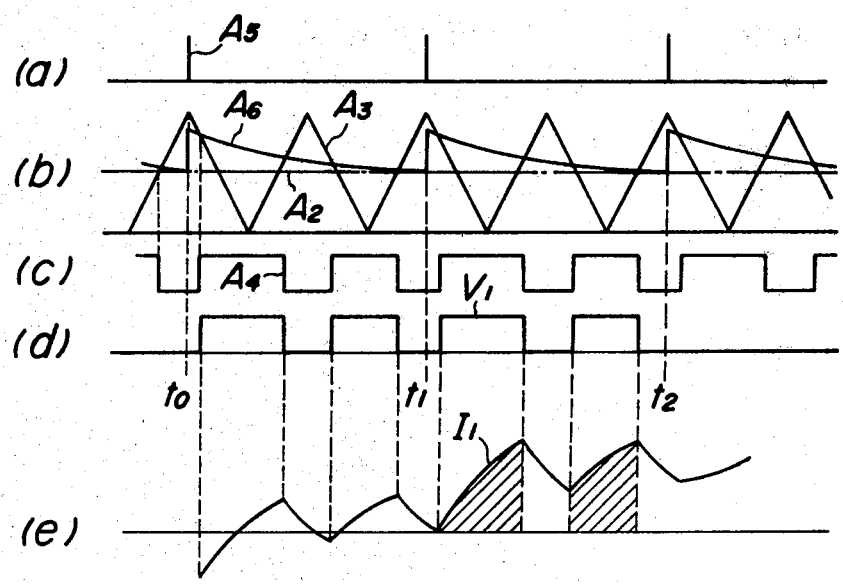
FIG. 4 is signal waveform diagram for explaining operation of the device of FIG. 3.

FIG. 3 shows the modulation part of the inverter according to the present invention, in which 9 is a trigger pulse generator and 10 is a function generator. In the figure, the same parts with that in FIG. 1 are designated by the same reference numerals. FIG. 4 is waveform diagrams for explaining operation of FIG. 3.

The trigger pulse generator 9 shown in FIG. 3 generates trigger pulses $A_5$ having very narrow pulse width at predetermined instants synchronized with the inverter output frequency. The function generator 10 is formed to derive an output signal having time function starting from an initial value at when the trigger pulse is given. In general, this generator 10 is of an exponential type being formed of condenser C and a resistor R using discharge characteristics of the CR elements. In the above construction, the condenser C may sufficiently be charged by the trigger pulse having very narrow pulse width by arranging the output impedance of the trigger pulse generator 9 to be small. After charging of this condenser C, the output of the trigger pulse generator 9 becomes zero voltage. All of the charge stored in the condenser C by the diode D is discharged through resistor R and the variation of terminal voltage of the condenser C assumes a waveform of exponential function. This resistor R may be a fixed value type if the amplitude of the function waveform to be added with the level signal $A_2$, which is a constant voltage level, can previously be selected according to the characteristics of the motor. This fixed value should be one for obtaining the desired voltage division ratio and the desired resistance value for discharge. The output of the function generator 10 produced in the aforementioned manner is added with the level signal $A_2$, which is same as shown in FIG. 1, in the adder 11 and an exponential function waveform $A_6$ as shown in FIG. 4(b) is obtained.

Accordingly, an inverter input current assumes waveform as shown by the hatched line portion of FIG. 4(e). The current waveform $I_1$ varies from one having a small initial value and wide pulse width to one having larger initial value and narrower pulse width. The total area of the hatched portion is nearly the same for each of the pulses and accordingly the average value of the inverter input current having nearly the same value can be obtained. The above explained embodiment of the present invention can be operated in the same manner with the conventional device as shown in FIG. 1 by applying an interruption instruction $A_7$ to the control terminal of the trigger pulse generator 9 and hence by stopping the generation of pulses. Therefore, when the filtering effect is sufficient by an increase of the inverter frequency or when the effect of the present invention is not required by some decrease of number of pulses of the chopping instruction $A_4$, the function of the present invention can be stopped. It is very easy to alter the output waveform of the function generator 10 in a sawtooth form or other function waveform by using the generating function thereof. Also it is easy to alter the output signal to match the variation of the inverter output frequency to assume always a similar waveform.

The advantage of the modulation system according to the present invention will be explained in more detail by referring to FIGS. 5 to 7.

Figure 5:
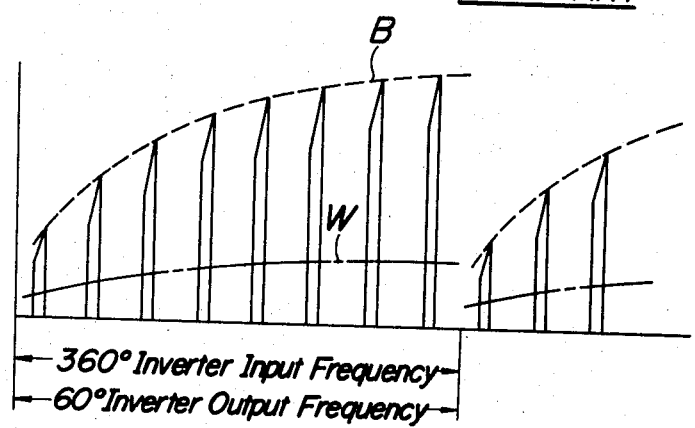
FIGS. 5 to 7 are waveform diagrams for explaining effect of the modulating part of the inverter device.

FIG. 5 shows inverter input current waveform in the conventional system as shown in FIG. 1, in which equip-interval pulse width modulation is effected by the modulation by the level signal $A_2$ and the carrier signal $A_3$. In this prior art system, the envelope B of the input current waveform of the inverter varies exponentially. Average current flowing in this stage is shown by W and a current having 6 times frequency component as that of the inverter output frequency flows in the circuit in response with the variation of this envelope B.

Figure 6:
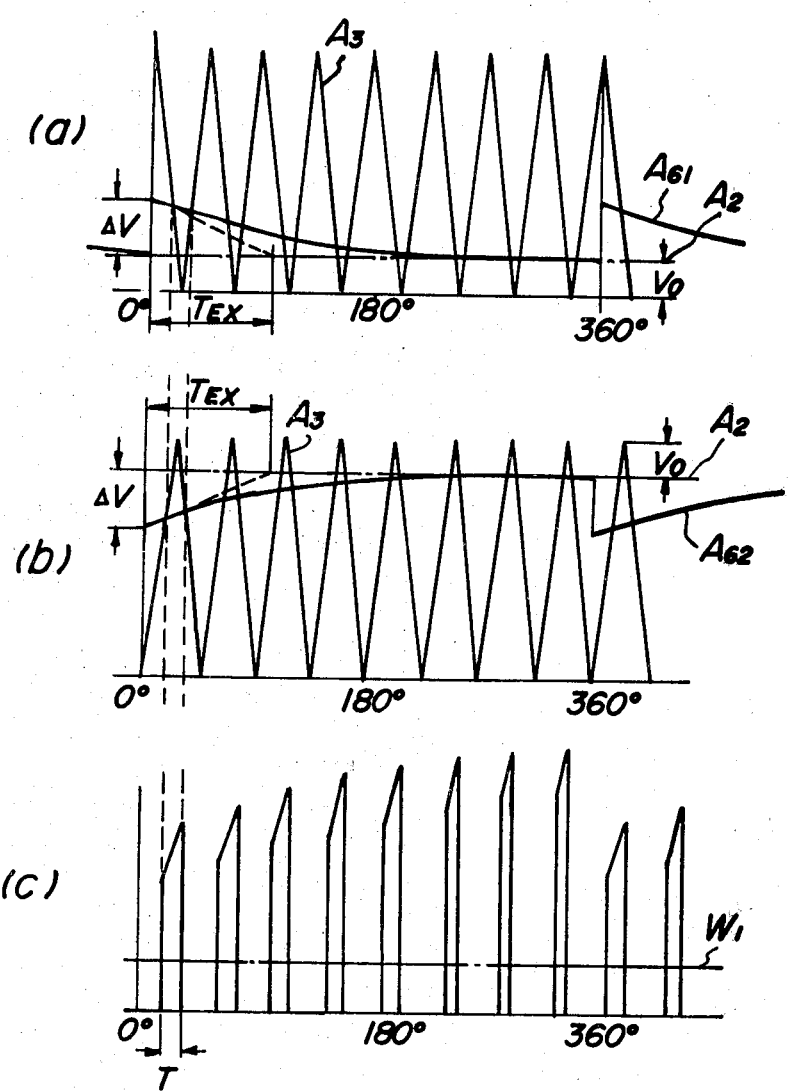

FIG. 6 shows input current waveforms of an inverter made in accordance with the present invention. FIG. 6(a) and FIG. 6(b) show respectively that for a case in which an exponential function waveform $A_6$ shown in FIG. 4 is applied.

In an embodiment in which an exponential function waveform $A_{61}$ shown in FIG. 6(a) is applied, the level signal frequency is 6 times of the inverter output frequency (m=3, 2m=6) and the frequency of the carrier signal $A_3$ is further integer multiple thereof, i.e. in the illustrated example 48 times multiple. The pulse width T is determined depending on the crossing points of the carrier signal $A_3$ and the exponential function waveform $A_{61}$. The pulse width decreases exponentially as shown in the drawings and the average value $W_1$ of the inverter input current for each one of the pulses can be made substantially constant as shown in FIG. 6(c). Accordingly, the pulsating current component having 6 times frequency with the inverter output frequency is suppressed and at the same time the commutating peak current is also decreased by the decrease of the pulse width as will be explained later on.

There still remains the chopping frequency components. However, by the filtering effect for the higher harmonics such components may sufficiently be suppressed so that a smooth dc current may flow at the source side from the feeder line at the input side of the filter towards the return circuit. In this connection the dc level $V_0$ is so controlled that the normal inverter output voltage is in proportion to the inverter output frequency just as same as the conventional modulation system. The depth of level $\Delta V$ of the exponential function waveform $A_{61}$ and its time constant $T_{EX}$ may also be made to have corelation with the inverter output frequency like the dc level $V_0$. However, by adjusting the fundamental frequency component of the inverter input current to be minimum at an input frequency of the inverter coinciding operating frequency of the aforementioned security signal apparatus, and by maintaining the depth of the level signal then and the time constant thereof, the current having the frequency component in problem can substantially be removed so that the object may be reached. In practice, the device may be designed to effect normal modulation from the time of starting when the filtering effect becomes inferior up to a time when the inverter input frequency passes the security signal frequency band using the commercial main frequency or a predetermined certain frequency. By this the lower harmonic components can be decreased to reduce disturbing current component to the security signal devices. The overall device including inverter 7 can be miniaturized and light weight device may be realized without the need of enlarging the filter capacity. Accordingly, the device of the present invention is particularly suitable for energizing an inverter of an electric train.

An exponential function waveform $A_{62}$ shown in FIG. 6(b) is an alternative of the case of FIG. 6(a) and by using this waveform $A_{62}$ an identical modulation result can be obtained. Namely, the exponential function waveform $A_{62}$ and the carrier signal $A_3$ are both reversed the polarity, the pulse width is determined in a range that the carrier signal $A_3$ is lower than the level signal $A_{62}$ of the exponential waveform and the pulse width T shown in FIG. 6(c) can be obtained. In practice in the circuit arrangement shown in FIG. 3, the output signal of the triangle wave generator 4, the dc level $V_0$ of the adder 11 and the output of the function generator 10 may be reversed.

Figure 7:
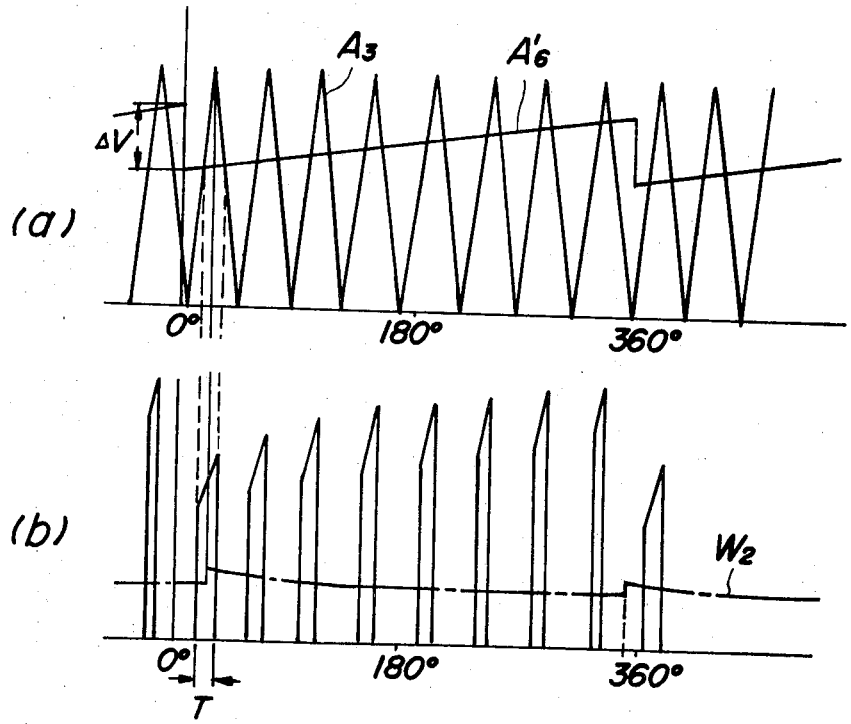

FIG. 7 shows modified embodiment of the modulation of the present invention. In this embodiment, in place of the exponential function waveforms $A_{61}$ and $A_{62}$ shown in FIGS. 6(a) and 6(b), respectively, the level signal $A'_6$ is given in sawtooth waveform. In this case the modulation level signal $A'_6$ is given in sawtooth form as shown in the drawing and the pulse width T of the inverter input current of each of the pulses in one cycle varies linearly along an electric angle $\theta$. According to this embodiment, the average value $W_2$ is not a constant one as can be seen from FIG. 7(b). But it affords a sufficient improvement over the conventional waveform as shown in FIG. 5 so that the object of the invention can be achieved in practice.

Figure 8:
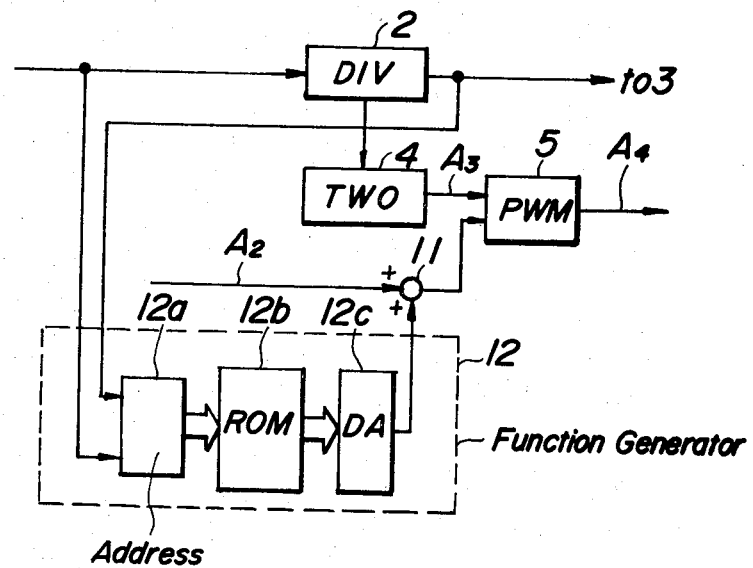
FIG. 8 is a block diagram of a modified embodiment according to the present invention.

For further improving the effect of the modulation system of the present invention it is desirable to realize a generator being able to always derive an analogous waveform irrespective of the variation of the inverter output frequency instead of the function waveform generator 10 shown in FIG. 3. FIG. 8 is an embodiment for realizing such a system.

In FIG. 8, reference numeral 12 designates a function waveform generator, which comprises an address instructor 12a, a waveform memory element 12b and a digital-to-analog (DA) converter 12c. The memory element 12b memorizes the exponential function waveform as shown in the drawing and the digital signal read out from the waveform memory element 12b is converted into an analog signal by the DA converter 12c. As same as the device shown in FIG. 3, this analog signal output is added with the level signal $A_2$ by the adder 11. The address instructor 12a successively renews the output signal by a pulse signal having frequency substantially higher than the inverter output frequency, for instance, by an input of the frequency divider 2. By this the content of the waveform memory element 12b is read out. Further in order to make the output of the DA converter to be desired repetition frequency, the returning to the initial condition at the desired time, for instance at the reversing time of the output of the final stage is also effected by said pulse signal.

As has been explained in the foregoing, the present invention is to realize a novel modulation system of a PWM inverter device in which the current commutating duty of the inverter can be substantially reduced so as to decrease current in lower order harmonic components and being able to cover the decrease of filtering effect at low frequency time. The invention thus is able to realize a small and light weight device.

What is claimed is:

1. A PWM inverter device for energizing ac motor with variable voltage and variable frequency output obtained from a dc current source by pulse width adjustment, characterized in that the device comprises an oscllator for generating a series of output pulses synchronized with output frequency of the inverter and having frequency integral multiple of the output frequency, a function waveform generator for generating level signal having frequency of 2 m times (m being an integer representing the number of phases of the inverter output device) of the inverter output frequency in response to the output of said oscillator, a triangle waveform oscillator for generating triangle wave shaped carrier signal having frequency of integral multiple of the level signal, a modulator for comparing and mixing said level signal with said carrier signal, wherein said level signal is generated in a functional form in order that the pulse width of the inverter output voltage decreases monotonically and to form repeated waveforms by a chopping instruction of the modulator output.

2. A PWM inverter device as claimed in claim 1, wherein said level signal generated by said function waveform generator and synchronized with said inverter output frequency and having 2 m times frequency with that of the output frequency is generated as a sawtooth waveform.

3. A PWM inverter device as claimed in claim 1, wherein said function waveform generator comprises a memory element for memorizing said function waveform and the signal is generated by reading out the memorized content.

4. A PWM inverter device as claimed in claim 1, wherein said level signal generated by said function waveform generator and synchronized with said inverter output frequency and having 2 m times frequency with that of the output frequency is generated as an exponential waveform.

5. A PWM inverter device for energizing ac motor with variable voltage and variable frequency output obtained from a dc current source by pulse width adjustment, characterized in that the device comprises an oscillator for generating a series of output pulses synchronized with output frequency of the inverter and having frequency integral multiple of the output frequency, a function waveform generator for generating level signal having frequency of 2 m times (m being an integer represening the number of phases of said inverter device) of the inverter output frequency in response to the output of said oscillator, a triangle waveform oscillator for generating triangle wave shaped carrier signal having frequency of integral multiple of the level signal, a modulator for comparing and mixing said level signal with said carrier signal, wherein during a period from starting time to a time when the inverter input frequency passes a certain predetermined frequency said level signal is generated in a function waveform in order that the pulse width of the inverter output voltage decreases monotonically and to form repeating waveforms by the chopping instruction.

* * * * *